United States Patent [19]
Idemoto et al.

[11] Patent Number: 5,889,079
[45] Date of Patent: Mar. 30, 1999

[54] ANTISLIPPING COMPOSITION

[75] Inventors: Kenji Idemoto, Urawa; Shigeru Nagasawa, Hasuda; Kenji Ueji, Kawaguchi; Kunihiko Asano, Urawa; Toshiyuki Uenoyama, Tochigi-ken, all of Japan

[73] Assignee: Konishi Co., Ltd., Osaka, Japan

[21] Appl. No.: 976,404

[22] Filed: Nov. 21, 1997

[51] Int. Cl.$^6$ ...................................................... C08J 5/14
[52] U.S. Cl. ........................... 523/149; 524/376; 524/388
[58] Field of Search .............................. 523/149; 524/376, 524/388, 443

[56] References Cited

U.S. PATENT DOCUMENTS

| | | |
|---|---|---|
| 5,062,895 | 11/1991 | Pockrandt . |
| 5,316,572 | 5/1994 | Okamura ................................. 106/714 |
| 5,525,149 | 6/1996 | Jakob et al. . |
| 5,622,553 | 4/1997 | Jakob et al. . |

FOREIGN PATENT DOCUMENTS

WO 91/01201  2/1991  WIPO .

*Primary Examiner*—Paul R. Michl
*Attorney, Agent, or Firm*—Frishauf, Holtz, Goodman, Langer & Chick, P.C.

[57] ABSTRACT

An antislipping composition for a fastener having a head portion, comprising a crosslinked polymer prepared by the polymerization of an olefinic unsaturated carboxylic acid and a compound represented by a general formula (1) given below

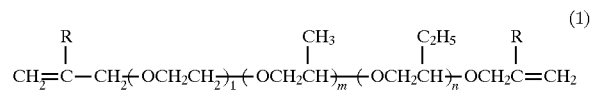

where R is a hydrogen atom or a methyl group, and the sum of l, m and n is larger than 0 and not larger than 500, except that where R is a hydrogen atom and n is zero, l+m is not 1, a liquid medium containing at least one compound selected from the group consisting of glycol ethers and glycerin, and silicon carbide particles having acute corner portions.

6 Claims, No Drawings

2

ANTISLIPPING COMPOSITION

BACKGROUND OF THE INVENTION

The present invention relates to an antislipping composition for a fastener having a head portion such as a bolt or a screw, particularly, to a composition which permits easily fastening or detaching the fastener with an ordinary tool such as a driver or a torque wrench even where a groove or a corner of the head portion is collapsed. The expression "fastener having a head portion" used herein represents a fastener to which force applied to a tool is transmitted through the head portion such as a bolt or a screw in fastening or detaching the fastener.

A fastener having a head portion such as a bolt or a screw is widely used in various fields. Where a groove or a corner of the head portion is collapsed, it is necessary to cut a new groove in the head portion or use a special tool in fastening or detaching the fastener. Such a special tool is not available in the general family. In such a case, the fastener must be forcedly fastened or detached using, for example, a cutting pliers. Under the circumstances, it is of high importance to develop a technique which permits easily fastening or detaching the fastener, even if a groove or a corner of the head portion of the fastener is collapsed.

BRIEF SUMMARY OF THE INVENTION

An object of the present invention is to provide an antislipping composition for a fastener having a head portion, comprising particles having a predetermined shape and a predetermined hardness, and a predetermined liquid medium which permits imparting fluidity to the composition and which exhibit low toxicity.

According to an aspect of the present invention, there is provided an antislipping composition for a fastener having a head portion, comprising:

a crosslinked polymer prepared by the polymerization of an olefinic unsaturated carboxylic acid and a compound represented by a general formula (1) given below:

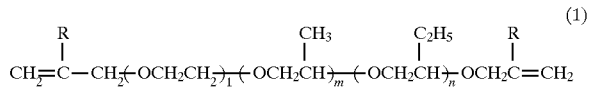

(1)

where R is a hydrogen atom or a methyl group, and the sum of 1, m and n is larger than 0 and not larger than 500, except that where R is a hydrogen atom and n is zero, l+m is not 1; a liquid medium containing at least one compound selected from the group consisting of glycol ethers and glycerin, and silicon carbide particles having acute corner portions.

DETAILED DESCRIPTION OF THE INVENTION

The antislipping composition of the present invention contains particles having a predetermined shape and a predetermined hardness. Silicon carbide particles having acute corner portions are used in the present invention as such particles. Where the particles contained in the composition are spherical or do not have acute corner portions, it is impossible to achieve a desired object. Specifically, where a screw or a bolt whose groove or corner in the head portion is collapsed is fastened or detached by an ordinary tool such as a driver, the groove or corner of the head portion is not mechanically caught by the tool. The mechanical catching is not achieved either where the particles have a low hardness, resulting in failure to achieve a desired object.

The particles contained in the composition are required to have acute corner portions, as pointed out above. The term "acute corner portion" denotes that the edges of the particles have acute angles. However, it is not necessary for all the edge portions of the particles to have acute angles. The silicon carbide particles having acute corner portions, which are specified in the present invention, can be obtained by pulverizing a crystalline silicon carbide. There are other particles having acute corner portions such as aluminum oxide particles. However, aluminum oxide does not exhibit a sufficiently high hardness, resulting in failure to achieve a desired object, as already pointed out.

It is desirable for the silicon carbide particles contained in the antislipping composition of the present invention to have a maximum particle size not larger than 300 μm and to include at least 60% by weight of particles having a particle size of at least 50 μm. The requirement of "a maximum particle size not larger than 300 μm and at least 60% by weight of the particles having at least 50 μm" represents particles falling within a particle size range of #80 to #180 defined in Particle Size Distribution of Coarse Grains of Abrasives in JIS (Japanese Industrial Standards) R6001. Where the head portion of a fastener is coated with an antislipping composition containing silicon carbide particles having a particle size exceeding 300 μm, it is difficult to mount correctly a tool such as a driver or a torque wrench to the head portion of the fastener, with the result that the force applied to the tool is not transmitted to the head portion of the fastener. On the other hand, where silicon carbide particles do not include at least 60% by weight of particles having a particle size of at least 50 μm, the groove or corner of the head portion of the fastener is not mechanically caught by the tool, resulting in failure to achieve a desired object. More preferably, the silicon carbide particles should fall within the particle size range of #100 and #150 specified in JIS R6001.

The silicon carbide particles should preferably be contained in the composition in an amount of 20 to 50% by weight of the composition. The amount smaller than 20% by weight is insufficient for allowing the groove or corner in the head portion of the fastener to be mechanically caught by the tool. On the other hand, if the amount of the silicon carbide particles is larger than 50% by weight, the fluidity of the composition is lowered, resulting in failure for the composition to enter a small clearance between groove or corner in the head portion of the fastener and the tool such as a driver or a torque wrench. More preferably, the silicon carbide particles should be contained in an amount of 30 to 40% by weight.

The antislipping composition of the present invention also contains a liquid medium containing at least one compound selected from the group consisting of glycol ethers and glycerin. Glycol ethers are effective for imparting a fluidity to the antislipping composition. Where the composition contains a glycol ether, fluidity is imparted to the composition to allow the composition to enter easily a small clearance to produce a desired effect in addition to the operability of the composition is improved. The glycol ethers effectively used in the present invention include, for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, ethylene glycol mono-tert-butyl ether, and 3-methyl-3-methoxybutanol. These compounds can be used singly or in the form of a mixture of some of these compounds. The most preferred glycol ether is 3-methyl-3-methoxybutanol.

In the present invention, glycerin can be used in place of or together with the glycol ethers exemplified above. It was certainly known to use ethylene glycol or propylene glycol as a liquid medium in an antislipping composition containing solid particles. However, ethylene glycol exhibits toxicity and, thus, should be handled carefully, making it undesirable for the antislipping composition used in the general family to contain ethylene glycol.

Also, ethylene glycol and propylene glycol were found to be poor and substantially equal to each other in the fluidity-imparting capability. On the other hand, compositions containing glycol ethers and/or glycerin exhibit excellent fluidity, as apparent from Examples described herein later.

Glycol ethers used in the present invention are also effective for preventing freezing. Further, since glycol ethers can be mixed with water at an optional mixing ratio, the fluidity of the composition can be controlled easily over a wide range. It is desirable for the content of glycol ether and/or glycerin to be 5 to 20% by weight of the composition. If the content is lower than 5% by weight, it is impossible to obtain sufficient effects of imparting fluidity to the composition and preventing the composition from being frozen. If the content exceeds 20% by weight, however, the fluidity of the composition is rendered excessively high, leading to a low viscosity of the composition. As a result, the silicon carbide particles fail to be stably kept dispersed in the composition. More preferably, the composition should contain 7.5 to 15% by weight of glycol ethers and/or glycerin.

The antislipping composition of the present invention also contains a crosslinked polymer. The crosslinked polymer, which is a carboxyvinyl polymer, is prepared by the polymerization of an olefinic unsaturated carboxylic acid and a compound represented by the general formula (1) given previously. The olefinic carboxylic acid has at least one active carbon-to-carbon olefinic double bond and at least one carboxyl group, and includes, for example, acrylic acid, methacrylic acid, itaconic acid, chloroacrylic acid, cyanoacrylic acid, α-phenyl acrylic acid, α-benzyl acrylic acid, crotonic acid, maleic acid, fumaric acid, and sorbic acid. Preferably, acrylic acid and methacrylic acid should be used as the olefinic unsaturated carboxylic acid.

For preparing the compound represented by general formula (1), alcohols having a molecular weight of about 150 to 1000 are used preferably as the starting materials.

The olefinic unsaturated carboxylic acid and the compound of formula (1) are polymerized and crosslinked to form a carboxyvinyl polymer. The polymerization should desirably be carried out in the presence of a catalyst within a solvent capable of dissolving both the olefinic unsaturated carboxylic acid and the compound of formula (1) and incapable of dissolving the resultant copolymer. For example, toluene, benzene, n-hexane, ethyl acetate, etc. can be used as the solvent. The azo type, peroxide type or redox type radical polymerization initiator can be used as the copolymerization catalyst. The specific compounds used as the catalyst include, for example, azo-bisisobutyronitile, 2,2'-azobis(2,4-dimethylvaleronitrile), 2,2'-azobis(2,4-dimethyl-4-methoxyvaleronitrile, benzoyl peroxide, cumene hydroperoxide, tert-butyl hydroperoxide, persulfate, a combination of persulfate and percarbonate, and a combination of persulfate and sulfite. The polymerization temperature, which is naturally dependent on the kinds of the catalyst, monomers, etc., should desirably be 30° to 90° C. in general.

Polyacrylates neutralized in advance are generally available on the market as thickeners. However, the conventional thickeners, if used in the present invention, are contained in the composition in a linearly stretched state. As a result, webbing is brought about to cause the composition to exhibit a viscosity having a so-called strong-knees and, thus, a good workability cannot be obtained. To overcome this difficulty, the carboxyvinyl polymer is used in the present invention to control appropriately the viscosity of the antislipping composition. The molecules of the carboxyvinyl polymer are contained in the composition in the shape of an aegagropilas or a coil. The particular condition is considered to prevent webbing and to provide a good workability of the composition. It should be noted that, if the carboxyvinyl polymer is neutralized with an alkali, it is possible to obtain a neutral or alkaline antislipping composition having a good workability. Preferably, sodium bicarbonate should be used for neutralizing the polymer, though a known alkali can be used for the neutralization.

The content of the carboxyvinyl polymer should desirably be 2 to 5% by weight of the composition. If the polymer content is less than 2% by weight, the silicon carbide particles are precipitated. If the polymer content is higher than 5% by weight, however, the viscosity of the composition is rendered excessively high, resulting in failure to obtain a good workability. Where the carboxyvinyl polymer is neutralized with sodium bicarbonate, the amount of the neutralizing agent should desirably be 0.2 to 2.0% by weight of the composition. If the amount of the neutralizing agent is smaller than 0.2% by weight, the silicon carbide particles are precipitated. If the amount exceeds 2.0% by weight, however, the viscosity of the composition is rendered excessively high, resulting in failure to obtain a composition having a good workability.

In the antislipping composition of the present invention, it is desirable for the liquid medium to contain water and a rust inhibitor in addition to sodium bicarbonate used as a neutralizing agent. In order to prevent the silicon carbide particles from being precipitated with time within the composition, it is desirable to add sodium bicarbonate as a neutralizing agent of the carboxyvinyl polymer so as to control appropriately the viscosity of the antislipping composition. Ammonia water or sodium hydroxide is generally known as a neutralizing agent. However, these known neutralizing agents, which emit a strong odor and constitute strong alkali, must be handled very carefully and, thus, are not desirable. On the other hand, sodium bicarbonate is free from the above-noted problems and, thus, can be handled easily. In addition, sodium bicarbonate is cheap and can be added directly, making it easy to use sodium bicarbonate in manufacturing the antislipping composition of the present invention. It is desirable to use sodium bicarbonate in a minimum amount required for neutralizing the carboxyvinyl polymer.

Known rust inhibitors can be used in the present invention as far as the inhibitor is compatible with the composition of the present invention. Specifically, the rust inhibitors used in the present invention include, for example, organic acids such as benzoic acid, alkenyl succinate, esters such as propyl benzoate, alkylamines such as alkanolamine, nitrites of amines, carboxylates of amines, and mineral oils. These rust inhibitors can be used singly or in the form of a mixture of these compounds. It is desirable to add the rust inhibitor in an amount of 0.1 to 5% by weight of the antislipping composition.

In preparing the composition of the present invention, for example, carboxyvinyl polymer is dissolved in a mixed liquid consisting of water and at least one of 3-methyl-3-methoxybutanol and glycerin, followed by neutralizing the polymer with sodium bicarbonate so as to adjust the viscosity of the resultant solution at a desired level. Then, silicon carbide particles and a rust inhibitor are added to the solution while stirring the solution to prepare a desired composition having these solid components uniformly mixed therein. The fluidity of the composition, which can be determined as desired, should desirably be about 15 to 50 Pa·s at 20° C. in general.

If the composition of the present invention is applied to the head portion of a fastener having a head portion such as a bolt or a screw, the fastener can be fastened easily by an ordinary tool such as a driver or a torque wrench without collapsing the groove or corner in the head portion of the fastener. Also, where the groove or corner in the head portion of the fastener is collapsed, the fastener can be detached easily by the ordinary tool if the head portion is coated with the composition of the present invention.

EXAMPLE 1

HIVISWAKO 103 (trade name of carboxyvinyl polymer manufactured by Wako Pure Chemical Industries, Ltd.) and sodium bicarbonate were dissolved in water, followed by adding 3-methyl-3-methoxybutanol to the resultant solution to obtain a viscous liquid. Further, DENSIC #60 (trade name of silicon carbide particles manufactured by Showa Denko K. K.) and RUSMIN W-50 (trade name of a rust inhibitor manufactured by Kyoeisha Chemical Corporation) were added to the resultant viscous liquid to obtain a sample of composition of Example 1. A homogenizer AM-7 manufactured by Nihonseiki Kaisha Ltd. was used for mixing and dissolving the components.

EXAMPLES 2 TO 5

Samples for these Examples were prepared as in Example 1, except for the particle size of the silicon carbide particles used.

EXAMPLES 6 TO 9

Samples for these Examples were prepared as in Example 1, except for the amount of the silicon carbide particles used.

EXAMPLES 10 TO 14

Samples for these Examples were prepared as in Example 1, except for the amount of 3-methyl-3-methoxybutanol used.

EXAMPLES 15 TO 18

Samples for these Examples were prepared as in Example 1, except that glycerin was used in varied amounts in place of 3-methyl-3-methoxybutanol used.

EXAMPLES 19 AND 20

Carboxyvinyl polymer (HIBISWAKO 103) and sodium bicarbonate were dissolved in water, followed by adding 3-methyl-3-methoxybutanol (Example 19) or glycerin (Example 20) to the resultant solution to obtain samples for these Examples. A homogenizer AM-7 referred to previously was used for dissolving the components. The viscosities of the viscous samples for these Examples were measured, and a thixotropic index denoting the viscosity properties was calculated on the basis of change in viscosity with the number of rotations of a viscometer.

EXAMPLES 21 TO 28

Samples for these Examples were prepared as in Example 1, except for the amount of carboxyvinyl polymer used.

COMPARATIVE EXAMPLES 1 TO 3

Samples for these Comparative Examples were prepared as in Example 1, except that the silicon carbide particles used in Example 1 were replaced by other materials.

COMPARATIVE EXAMPLES 4 TO 8

Samples for these Comparative Examples were prepared as in Example 1, except that ethylene glycol was used in place of 3-methyl-3-methoxybutanol used in Example 1.

COMPARATIVE EXAMPLE 9

A sample for this Comparative Example was prepared as in Example 20, except that the amount of water used was 500 parts by weight and that glycerin used in Example 20 was not used in this Comparative Example.

COMPARATIVE EXAMPLE 10

A sample for this Comparative Example was prepared as in Example 20, except that ethylene glycol was used in this Comparative Example in place of glycerin used in Example 20.

COMPARATIVE EXAMPLES 11 AND 12

Samples for these Comparative Examples were prepared as in Example 1, except that carboxyvinyl polymer used in Example 1 was replaced by other materials.

The samples for these Examples and Comparative Examples were evaluated as follows:
Evaluation 1:
A head portion with a collapsed groove of a screw was coated with each of the samples. Then, the screw was detached and fastened with a driver to evaluate the effect produced by the sample compositions, with the results as shown in Tables 2, 3 and 5. The compositions of these samples are also shown in these Tables. The evaluations are given in these Tables by symbols given below:

⊚: excellent; ○: effective;

Δ: slightly effective: x: not effective

Evaluation 2:
Each of the samples was filled in a container provided with a nozzle, and evaluated the squeezing property, thixotropic property, webbing property, and dispersion stability of the sample as discharged from the nozzle. Tables 2, 3, 4 and 5 show the results. The evaluations are given in these Tables by symbols given below:

⊚: excellent; ○: effective;

Δ1: low in effect of improving dispersion stability;

Δ2: low in effect of improving thixotropic property;

Δ3: low in effect of improving squeezing property;

x1: poor in dispersion stability;

x2: not effective in respect of thixotropic property;

x3: incapable of squeezing;

x4: webbing from nozzle.

The raw materials used in the Examples and Comparative Examples are summarized in Table 1.

TABLE 1

| Raw material | Manufactures | Trade name |
|---|---|---|
| silicon carbide particles | Showa Denko K.K. | DENSIC #60 ~ #220 |
| Aluminum oxide particles | Showa Denko K.K. | MORUNDUM #120 (Brown Fused Alumina MORUNDUM) |
| Carboxyvinyl polymer | Wako Pure Chemical Industries, Ltd. | HIVISWAKO 103 |
| Polysodiumacrylate | NIPPON SHOKUBAI Co. Ltd. | AQUALIC IH-N |
| Rust inhibitor | KYOEISHA CHEMICAL CORPORATION | RUSMIN W-50 |
| Sand particles having obtuse corners | Nihon Ceraway Kaisha Co., Ltd. | DAURAREC NC |
| Silica-alumina micro hollow spheres | JAPAN FILLITE Co. Ltd. | FILLITE 52/7 |

TABLE 2

| | particle size defined in JIS R6001 | Example 1 | Example 2 | Example 3 | Example 4 | Example 5 |
|---|---|---|---|---|---|---|
| DENSIC #60 | #60 | 35.0 | | | | |
| #80 | #80 | | 35.0 | | | |
| #120 | #120 | | | 35.0 | | |
| #180 | #180 | | | | 35.0 | |
| #220 | #220 | | | | | 35.0 |
| MORUNDUM #120 | | | | | | |
| DAURAREC NC | | | | | | |
| FILLITE 52/7 | | | | | | |
| HIVISWAKO 103 | | 1.0 | 1.0 | 1.0 | 1.0 | 1.0 |
| sodium bicarbonate | | 1.0 | 1.0 | 1.0 | 1.0 | 1.0 |
| water | | 51.5 | 51.5 | 51.5 | 51.5 | 51.5 |
| RUSMIN W-50 | | 1.5 | 1.5 | 1.5 | 1.5 | 1.5 |
| 3-methyl-3-methoxybutanol | | 10.0 | 10.0 | 10.0 | 10.0 | 10.0 |
| Evaluation 1 | | Δ | ○ | ◎ | ○ | Δ |
| Evaluation 2 | | ○ | ○ | ○ | ○ | ○ |

| | particle size defined in JIS R6001 | Example 6 | Example 7 | Example 8 | Example 9 |
|---|---|---|---|---|---|
| DENSIC #60 | #60 | | | | |
| #80 | #80 | | | | |
| #120 | #120 | 10.0 | 20.0 | 50.0 | 60.0 |
| #180 | #180 | | | | |
| #220 | #220 | | | | |
| MORUNDUM #120 | | | | | |
| DAURAREC NC | | | | | |
| FILLITE 52/7 | | | | | |
| HIVISWAKO 103 | | 1.0 | 1.0 | 1.0 | 1.0 |
| sodium bicarbonate | | 1.0 | 1.0 | 1.0 | 1.0 |
| water | | 76.5 | 66.5 | 36.5 | 26.5 |
| RUSMIN W-50 | | 1.5 | 1.5 | 1.5 | 1.5 |
| 3-methyl-3-methoxybutanol | | 10.0 | 10.0 | 10.0 | 10.0 |
| Evaluation 1 | | Δ | ○ | ○ | Δ |
| Evaluation 2 | | ○ | ○ | ○ | ○ |

| | particle size defined in JIS R6001 | Comparative Example 1 | Comparative Example 2 | Comparative Example 3 |
|---|---|---|---|---|
| DENSIC #60 | #60 | | | |
| #80 | #80 | | | |
| #120 | #120 | | | |
| #180 | #180 | | | |
| #220 | #220 | | | |
| MORUNDUM #120 | | 35.0 | | |
| DAURAREC NC | | | 35.0 | |
| FILLITE 52/7 | | | | 35.0 |
| HIVISWAKO 103 | | 1.0 | 1.0 | 1.0 |
| sodium bicarbonate | | 1.0 | 1.0 | 1.0 |

TABLE 2-continued

| | | | |
|---|---|---|---|
| water | 51.5 | 51.5 | 51.5 |
| RUSMIN W-50 | 1.5 | 1.5 | 1.5 |
| 3-methyl-3-methoxybutanol | 10.0 | 10.0 | 10.0 |
| Evaluation 1 | × | × | × |
| Evaluation 2 | ○ | ○ | ○ |

TABLE 3

| | Example 10 | Example 11 | Example 12 | Example 13 | Example 14 |
|---|---|---|---|---|---|
| 3-methyl-3-methoxybutanol | 5.0 | 7.5 | 15.0 | 20.0 | 25.0 |
| glycerin | | | | | |
| ethylene glycol | | | | | |
| HIVISWAKO 103 | 1.0 | 1.0 | 1.0 | 1.0 | 1.0 |
| sodium bicarbonate | 1.0 | 1.0 | 1.0 | 1.0 | 1.0 |
| water | 56.5 | 54.0 | 46.5 | 41.5 | 36.5 |
| RUSMIN W-50 | 1.5 | 1.5 | 1.5 | 1.5 | 1.5 |
| DENSIC #120 | 35.0 | 35.0 | 35.0 | 35.0 | 35.0 |
| Evaluation 1 | ○ | ○ | ○ | ○ | ○ |
| Evaluation 2 | ○ | ⊙ | ⊙ | ⊙ | Δ1 |

| | Example 15 | Example 16 | Example 17 | Example 18 |
|---|---|---|---|---|
| 3-methyl-3-methoxybutanol | | | | |
| glycerin | 5.0 | 10.0 | 20.0 | 25.0 |
| ethylene glycol | | | | |
| HIVISWAKO 103 | 1.0 | 1.0 | 1.0 | 1.0 |
| sodium bicarbonate | 1.0 | 1.0 | 1.0 | 1.0 |
| water | 56.5 | 51.5 | 41.5 | 36.5 |
| RUSMIN W-50 | 1.5 | 1.5 | 1.5 | 1.5 |
| DENSIC #120 | 35.0 | 35.0 | 35.0 | 35.0 |
| Evaluation 1 | ○ | ○ | ○ | ○ |
| Evaluation 2 | Δ2 | ○ | ○ | Δ1 |

| | Comparative Example 4 | Comparative Example 5 | Comparative Example 6 | Comparative Example 7 | Comparative Example 8 |
|---|---|---|---|---|---|
| 3-methyl-3-methoxybutanol | | | | | |
| glycerin | | | | | |
| ethylene glycol | 5.0 | 10.0 | 20.0 | 25.0 | 30.0 |
| HIVISWAKO 103 | 1.0 | 1.0 | 1.0 | 1.0 | 1.0 |
| sodium bicarbonate | 1.0 | 1.0 | 1.0 | 1.0 | 1.0 |
| water | 56.5 | 51.5 | 41.5 | 36.5 | 31.5 |
| RUSMIN W-50 | 1.5 | 1.5 | 1.5 | 1.5 | 1.5 |
| DENSIC #120 | 35.0 | 35.0 | 35.0 | 35.0 | 35.0 |
| Evaluation 1 | ○ | ○ | ○ | ○ | ○ |
| Evaluation 2 | ×2 | ×2 | ○ | ○ | ×1 |

TABLE 4

| | | Example 19 | Example 20 | Comparative Example 9 | Comparative Example 20 |
|---|---|---|---|---|---|
| water | | 400.0 | 400.0 | 500.0 | 400.0 |
| 3-methyl-3-methoxybutanol | | 100.0 | | | |
| glycerin | | | 100.0 | | |
| ethylene glycol | | | | | 100.0 |
| HIVISWAKO 103 | | 5.0 | 5.0 | 5.0 | 5.0 |
| sodium bicarbonate | | 5.0 | 5.0 | 5.0 | 5.0 |
| Viscosity (Pa · s) | 2 rpm | 150.0 | 400.0 | 170.0 | 330.0 |
| BH type viscometer | 4 rpm | 110.0 | 286.0 | 110.0 | 240.0 |
| Rotor No. 7 | 20 rpm | 29.6 | 91.0 | 60.0 | 86.8 |
| thixotropic index | 2 rpm/20 rpm | 5.07 | 4.40 | 2.83 | 3.80 |
| | 4 rpm/20 rpm | 3.71 | 3.14 | 1.83 | 2.74 |

TABLE 5

|  | COMPONENTS | Example 21 | Example 22 | Example 23 | Example 24 | Example 25 |
|---|---|---|---|---|---|---|
| HIVISWAKO 103 | carboxyvinyl polymer | 1.0 | 2.0 | 5.0 | 6.0 | 0.1 |
| AQUALIC IH-N | sodium polyacrylate | | | | | |
| SMECTITE SWN | hydrophilic smectite | | | | | |
| sodium bicarbonate | | | | | | 0.1 |
| DENSIC #120 | | 35.0 | 35.0 | 35.0 | 35.0 | 35.0 |
| water | | 52.0 | 51.5 | 48.5 | 47.5 | 53.3 |
| RUSMIN W-50 | | 1.5 | 1.5 | 1.5 | 1.5 | 1.5 |
| 3-methyl-3-methoxybutanol | | 10.0 | 10.0 | 10.0 | 10.0 | 10.0 |
| Evaluation 1 | | ○ | ○ | ○ | ○ | ○ |
| Evaluation 2 | | Δ1 | ○ | ○ | Δ3 | Δ1 |

|  | COMPONENTS | Example 26 | Example 27 | Example 28 | Comparative Example 11 | Comparative Example 12 |
|---|---|---|---|---|---|---|
| HIVISWAKO 103 | carboxyvinyl polymer | 0.2 | 2.0 | 2.5 | | |
| AQUALIC IH-N | sodium polyacrylate | | | | 2.0 | |
| SMECTITE SWN | hydrophilic smectite | | | | | 2.0 |
| sodium bicarbonate | | 0.2 | 2.0 | 2.5 | | |
| DENSIC #120 | | 35.0 | 35.0 | 35.0 | 35.0 | 35.0 |
| water | | 53.1 | 49.5 | 48.5 | 51.5 | 51.5 |
| RUSMIN W-50 | | 1.5 | 1.5 | 1.5 | 1.5 | 1.5 |
| 3-methyl-3-methoxybutanol | | 10.0 | 10.0 | 10.0 | 1.5 | 1.5 |
| Evaluation 1 | | ○ | ○ | ○ | ○ | ○ |
| Evaluation 2 | | ○ | ○ | Δ3 | ×4 | ×1 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An antislipping composition for a fastener having a head portion, comprising:

a crosslinked polymer prepared by the polymerization of an olefinic unsaturated carboxylic acid and a compound represented by a general formula (1) given below:

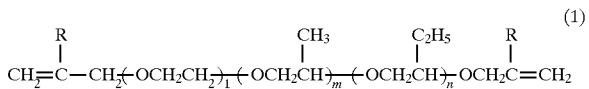
(1)

where R is a hydrogen atom or a methyl group, and the sum of l, m and n is larger than 0 and not larger than 500, except that where R is a hydrogen atom and n is zero, l+m is not 1; a liquid medium containing at least one compound selected from the group consisting of glycol ethers and glycerin, and silicon carbide particles having acute corner portions.

2. The composition according to claim 1, wherein said liquid medium contains at least one compound selected from the group consisting of 3-methyl-3-methoxybutanol, ethylene glycol mono-tert-butyl ether, and glycerin.

3. The composition according to claim 1, wherein the maximum particle size of said silicon carbide particles is not larger than 300 μm, and at least 60% by weight of the silicon carbide particles have a particle size not smaller than 50 μm.

4. The composition according to claim 1, wherein the amount of said silicon carbide particles is 20 to 50% by weight of the composition.

5. The composition according to claim 1, wherein the amount of said at least one compound selected from the group consisting of glycol ethers and glycerin is 5 to 20% by weight of the composition.

6. The composition according to claim 1, wherein said composition has a viscosity of 15 to 50 Pa·s.

* * * * *